US008566825B2

(12) United States Patent
Bozek et al.

(10) Patent No.: US 8,566,825 B2
(45) Date of Patent: *Oct. 22, 2013

(54) DYNAMIC MIGRATION OF VIRTUAL MACHINE COMPUTER PROGRAMS UPON SATISFACTION OF CONDITIONS

(75) Inventors: James J. Bozek, Bothell, WA (US); Robert E. Stephens, Snoqualmie, WA (US); James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/342,705

(22) Filed: Jan. 3, 2012

(65) Prior Publication Data
US 2012/0137293 A1    May 31, 2012

Related U.S. Application Data

(63) Continuation of application No. 10/841,725, filed on May 8, 2004, now Pat. No. 8,156,490.

(51) Int. Cl.
*G06F 9/455* (2006.01)
*G06F 9/46* (2006.01)
*G06F 11/00* (2006.01)

(52) U.S. Cl.
USPC .............. 718/1; 718/104; 718/105; 714/4.11; 714/6.3

(58) Field of Classification Search
None
See application file for complete search history.

(56) References Cited

U.S. PATENT DOCUMENTS

| 5,437,033 | A  | 7/1995  | Inoue et al.     |
|-----------|----|---------|------------------|
| 6,131,166 | A  | 10/2000 | Wong-Insley      |
| 6,397,242 | B1 | 5/2002  | Devine et al.    |
| 6,397,247 | B1 | 5/2002  | Shirakawa et al. |
| 6,502,148 | B1 | 12/2002 | Krum             |
| 6,542,926 | B2 | 4/2003  | Zalewski et al.  |

(Continued)

FOREIGN PATENT DOCUMENTS

| EP | 1 418 501 A  | 5/2004  |
|----|--------------|---------|
| JP | 10-283210 A  | 10/1998 |

(Continued)

OTHER PUBLICATIONS

VMWare, "VMWare Virtual Center User's Manual," v1.0, Mar. 19, 2004.

(Continued)

*Primary Examiner* — Camquy Truong
(74) *Attorney, Agent, or Firm* — Thomas Tyson

(57) ABSTRACT

A system includes a number of server computing devices and a management server computing device. Each server computing device has a virtual host computer program running thereon to support one or more virtual machine computer programs. Each virtual machine computer program is able to execute an instance of an operating system on which application computer programs are executable. The management server computing device monitors the server computing devices, and causes the virtual machine computer programs supported by the virtual host computer program of a first server computing device to dynamically migrate to the virtual host computer program of a second server computing device, upon one or more conditions being satisfied. The conditions may include the first server being predicted as failure prone, the first server consuming power less than a threshold, and the first server having resource utilization less than a threshold.

12 Claims, 5 Drawing Sheets

(56) References Cited

U.S. PATENT DOCUMENTS

| | | |
|---|---|---|
| 6,571,283 B1 | 5/2003 | Smorodinsky |
| 6,609,212 B1 | 8/2003 | Smith |
| 6,634,019 B1 | 10/2003 | Rice et al. |
| 6,691,165 B1 | 2/2004 | Bruck et al. |
| 6,802,020 B1 | 10/2004 | Smith |
| 6,968,414 B2 | 11/2005 | Abbondanzio et al. |
| 6,978,398 B2 | 12/2005 | Harper et al. |
| 7,203,944 B1 | 4/2007 | van Rietschote et al. |
| 7,269,751 B2 | 9/2007 | Janakiraman et al. |
| 8,156,490 B2 * | 4/2012 | Bozek et al. ............ 718/1 |
| 2002/0002578 A1 | 1/2002 | Yamashita |
| 2002/0083110 A1 | 6/2002 | Kozuch et al. |
| 2002/0156932 A1 | 10/2002 | Schneiderman |
| 2003/0074598 A1 | 4/2003 | Bossen et al. |
| 2003/0120811 A1 | 6/2003 | Hanson et al. |
| 2004/0003324 A1 | 1/2004 | Uhlig et al. |
| 2004/0024831 A1 | 2/2004 | Yang et al. |
| 2004/0128670 A1 | 7/2004 | Robinson et al. |
| 2005/0114739 A1 | 5/2005 | Gupta et al. |
| 2006/0246436 A1 | 11/2006 | Ohno et al. |
| 2007/0130566 A1 | 6/2007 | van Rietschote et al. |

FOREIGN PATENT DOCUMENTS

| | | | |
|---|---|---|---|
| JP | 2002-007364 | A | 1/2002 |
| JP | 2003-067351 | A | 3/2003 |
| JP | 2003-162515 | A | 6/2003 |
| JP | 2004000018 | A | 1/2004 |
| JP | 2004133894 | A | 4/2004 |
| WO | 01/35242 | A | 5/2001 |

OTHER PUBLICATIONS

E. Pinheiro et al., "Load balancing and unbalancing . . . ," Rutgers Technical Report DCS-TR-440, May 2001.

DJ Bradley et al., "Workload-based power management . . . ," IBM Journal of R&D, Sep. 2003.

Rajamani et al, "On evaluating request-distribution schemes . . . ," In Proceedings of the IEEE International Symposium on Performance Analysis of Systems and Software, 2003.

Sapuntzakis et al., "Optimizing the migration of virtual computers," In Proceedings of the 5th Symposium on Operating Systems Design and Implementation, 2002.

\* cited by examiner

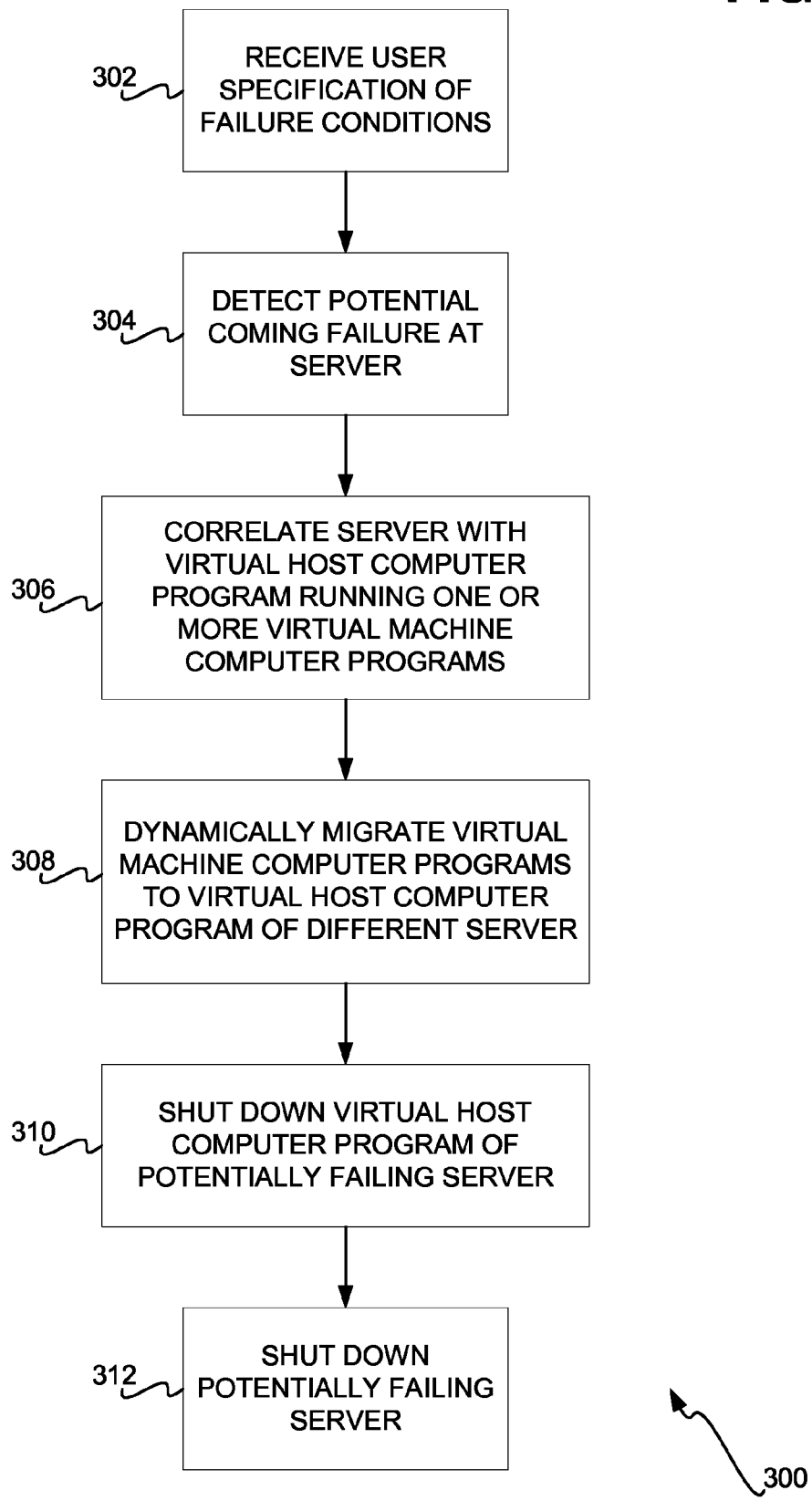

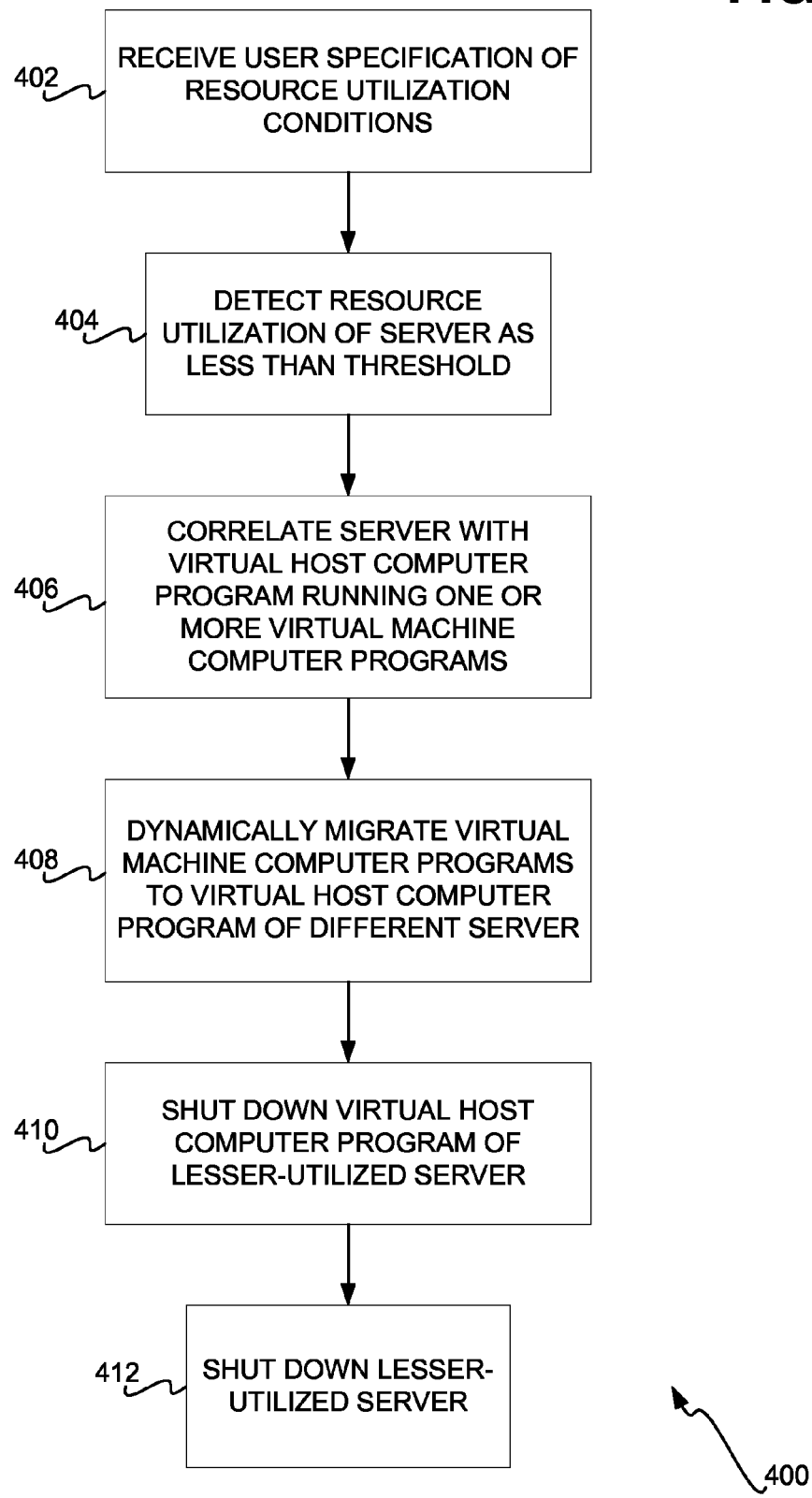

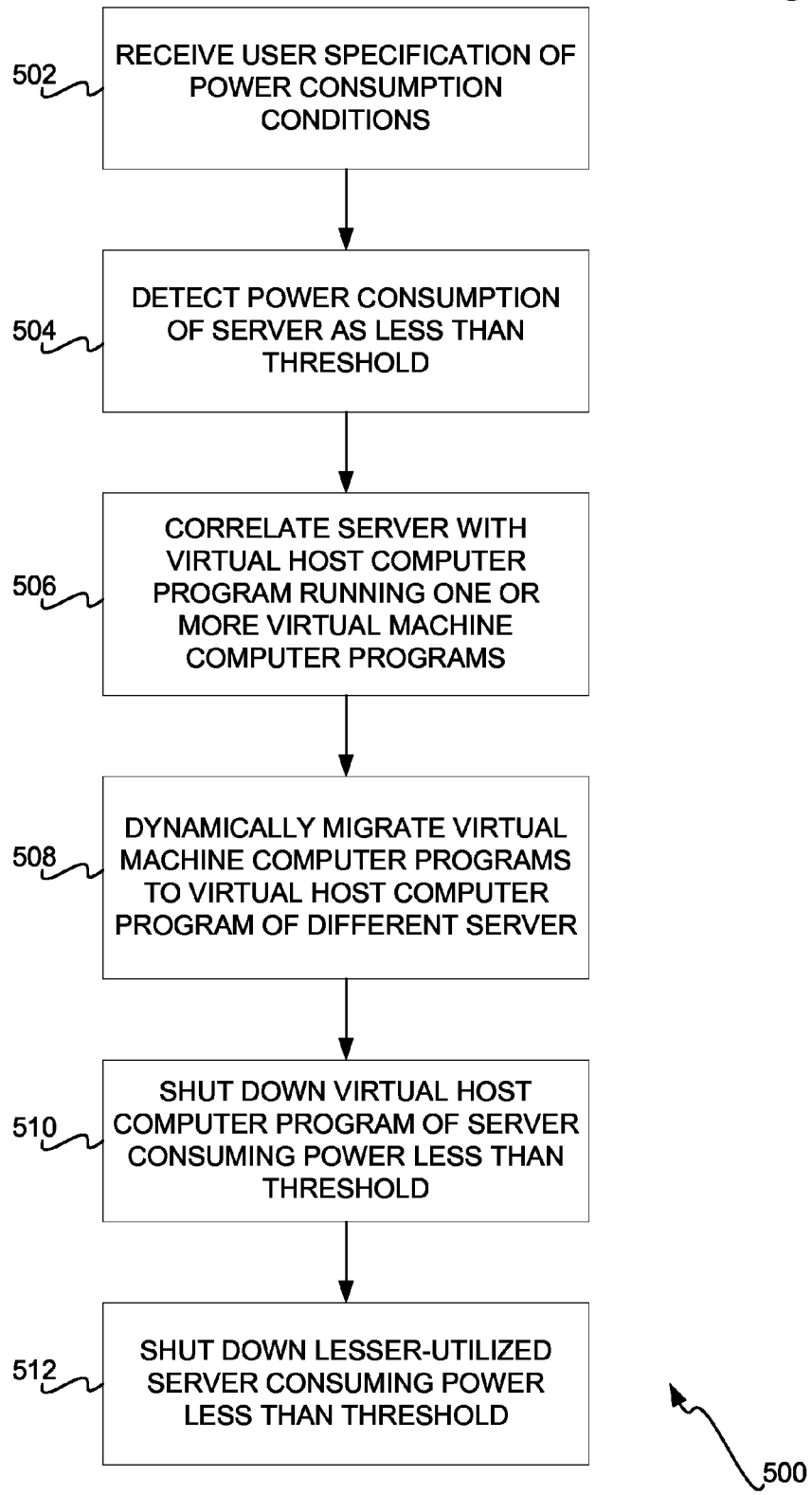

DYNAMIC MIGRATION OF VIRTUAL MACHINE COMPUTER PROGRAMS UPON SATISFACTION OF CONDITIONS

RELATED APPLICATIONS

The present patent application is a continuation of the patent application of the same title, filed on May 8, 2004, and assigned application Ser. No. 10/841,725, now U.S. Pat. No. 8,156,490.

FIELD OF THE INVENTION

The present invention relates generally to virtual host computer programs running on server computing devices and that can support virtual machine computer programs. The invention more particularly relates to the dynamic migration of such virtual machine computer programs from a virtual host computer program running on one server computing device to a virtual host computer program running on another server computing device.

BACKGROUND OF THE INVENTION

A common type of network that is deployed in organizations is the client-server network. In a client-server network, there may be a number of client computing devices, or clients, which are typically used by end users of an organization, and a number of server computing devices, or servers, which are computing devices that are shared among the clients, and thus the users. Types of servers can include application servers, file servers, intranet servers, e-mail servers, electronic commerce servers, print servers, proxy servers, and web servers, among other kinds of servers.

To reduce information technology (IT) costs, some types of servers can run virtual host computer programs. A virtual host computer program is a type of supervising computer program, which enables a number of virtual machine computer programs to be run on the server. A virtual machine computer program allows a separate instance of an operating system to be run thereon, such as versions of the Microsoft Windows® operating system, versions of the UNIX® operating system, and versions of the Linux® operating system.

In an environment within which virtual machine computer programs are run on virtual host computer programs of servers, users may not be required to have full-fledged client computing devices. Rather, each user may be assigned a virtual machine computer program, and have a reduced-capability client computing device that basically handles input from the user to send to the virtual machine computer program, and output from the virtual machine computer program to the user. The server on which the virtual machine computer program runs thus provides the computational support for a number of users, so that expensive clients are not needed for these users.

In these and other types of uses of virtual machine computer programs, maintaining high availability of the servers is important. For instance, a faulty server can affect a number of users, whereas a faulty client may affect just a single user. Mission-critical application computer programs may run in conjunction with the operating systems of the virtual machine computer programs, regardless of whether the virtual machine computer programs correspond to particular users or whether they run multiple user-type application computer programs. A faulty server in this instance may affect a number of virtual machine computer programs, and thus a number of mission-critical application computer programs, which can be expensive to the organizations running these mission-critical application programs.

Furthermore, in most organizations, power conservation has become an issue, both to reduce operational costs of IT, and to prove to the general public that the organizations are good public citizens. In many situations, a larger number of servers than is typically needed are powered on, for peak-utilization situations in which the processing capability of all the servers may be needed. However, the occurrence of such peak-utilization situations may be infrequent, wasting electrical power for the majority of the time in which all of the servers remain powered on.

For these and other reasons, there is a need for the present invention.

SUMMARY OF THE INVENTION

A system of an embodiment of the present invention includes a network, a number of server computing devices, and a management server computing device. The server computing devices are communicatively coupled to the network. Each server computing device has a virtual host computer program running thereon to support one or more virtual machine computer programs. Each virtual machine computer program is able to execute an instance of an operating system on which application computer programs are executable. The management server computing device is also communicatively coupled to the network. The management server computing device monitors the server computing devices, and causes the virtual machine computer programs supported by the virtual host computer program of one of the server computing devices to migrate to the virtual host computer program of another of the server computing devices, upon one or more conditions being satisfied.

A management system of another embodiment of the present invention is for a number of server computing devices that have virtual host computer programs running thereon to support virtual machine computer programs that are able to execute instances of operating systems. The management system includes a coordinator server computing device and a management server computing device. The coordinator server computing device communicates with and coordinates the virtual machine computer programs supported by the virtual host computer programs of the server computing devices. The management server computing device causes the virtual machine computer programs supported by the virtual host computer program of a first server computing device to migrate to the virtual host computer program of a second server computing device, upon detecting one or more conditions being satisfied. The management server computing device causes the migration by communicating with the coordinator server computing device.

An article of manufacture of an embodiment of the invention includes a computer-readable medium and means in the medium. The means is for dynamically migrating virtual machine computer programs supported by a virtual host computer program of a first server computing device to a virtual host computer program of a second server computing device, without restarting the virtual machine computer programs, upon one or more conditions being satisfied. The conditions may include one or more of: the first server computing device being predicted as failure prone; the first server computing device being determined as having resource utilization less than a threshold; and, the first server computing device being determined as having power consumption less than a threshold.

A method of varying embodiments of the invention first predicts a failure at a first server computing device, detects resource utilization at the first server computing device as less than a threshold, and/or detects power consumption of the first server computing device as less than a threshold. In response, the method correlates the first server computing device with a virtual host computer program supporting one or more virtual machine computer programs. The method dynamically migrates the virtual machine computer programs from the virtual host computer program of the first server computing device to a virtual host computer program of a second server computing device.

Embodiments of the invention provide for advantages over the prior art. Maximum server availability is provided by predicting failures at servers, and, before these servers can fail, their virtual machine computer programs are dynamically migrated to another server. Dynamic migration means that the operating systems supported by these virtual machine computer programs do not have to be shutdown or restarted during the migration process. Power conservation is provided by monitoring resource utilization of the servers and/or power consumption of the servers. When, for a given server, either falls below a corresponding threshold, this means that the server's processing capability is not being efficiently utilized, such that it should and can be powered down until the capability is needed. Therefore, the virtual machine computer programs running on the server are dynamically migrated to another server, and the former server shut down.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention, unless otherwise explicitly indicated, and implications to the contrary are otherwise not to be made.

FIG. 3 is a flowchart of a method for ensuring maximum server availability, according to an embodiment of the invention.

FIG. 4 is a flowchart of a method for ensuring power conservation by monitoring resource utilization, according to an embodiment of the invention.

FIG. 5 is a flowchart of a method for ensuring power conservation by monitoring power consumption, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

System and Overview

Figure 1:
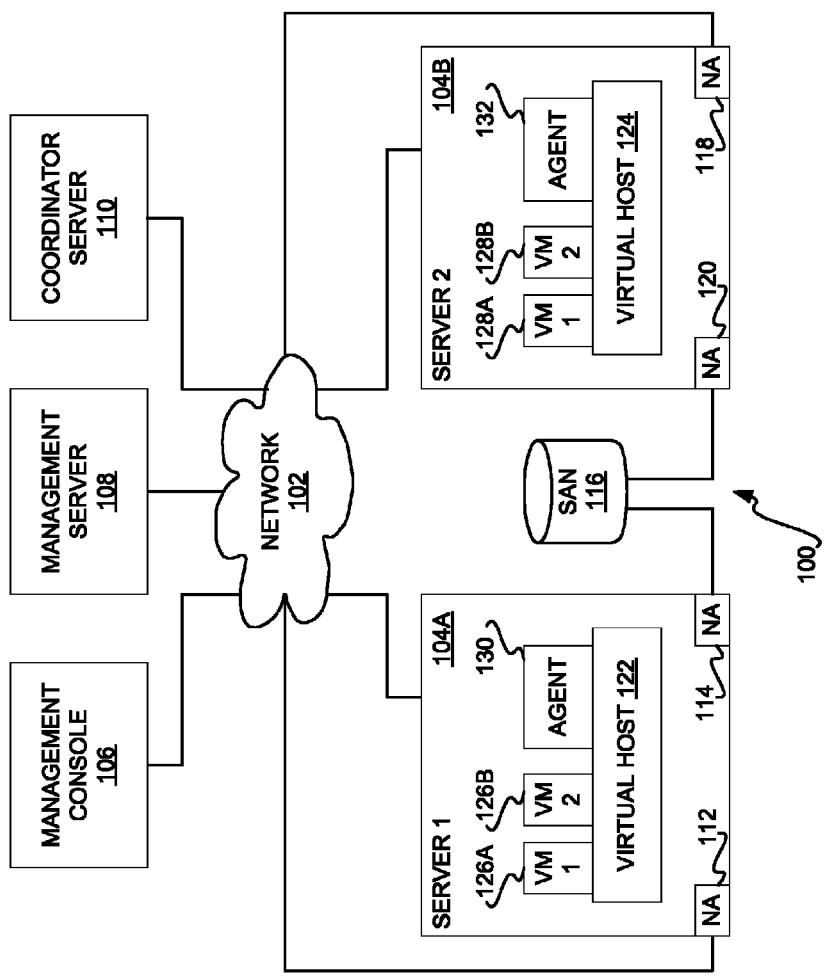
FIG. 1 is a diagram of a system in which there are servers having virtual host computer programs that support virtual machine computer programs, according to an embodiment of the invention.

FIG. 1 shows a system 100, according to an embodiment of the invention. The system 100 includes a network 102, to which servers 104A and 104B, collectively referred to as the servers 104, are communicatively coupled. Although FIG. 1 shows two of the servers 104, there may be more than two of the servers 104 in one embodiment. A management console 106, a management server 108, and a coordinator server 110, which together may be considered to be a management system for the servers 104, are also each communicatively coupled to the network 102. The network 102 may be or include one or more of: a local-area network (LAN), a wide-area network (WAN), an intranet, an extranet, the Internet, a wired network, a wireless network, and a telephony network, among other types of networks.

Each of the servers 104 is a server computing device. The server 104A includes a network adapter 112 to communicatively couple the server 104A to the network 102, whereas the server 104B includes a network adapter 118 to communicatively couple the server 104B to the network 102. The server 104A also includes a network adapter 114 to communicatively couple the server 104A to a separate storage area network (SAN) 116, whereas the server 104B includes a network adapter 120 to communicatively couple the server 104B to the SAN 116. The SAN 116 is a networked collection of storage, such as hard disk drives, that are available to both of the servers 104. Furthermore, the servers 104 may each include other hardware components beside those indicated in FIG. 1, such as processors, memory, and so on.

The server 104A has a virtual host computer program 122 running thereon, while the server 104B has a virtual host computer program 124 running thereon. The virtual host computer programs 122 and 124 are supervisory computer programs that enable a number of virtual machines to run on the servers 104. For instance, the server 104A has virtual machine computer programs 126A and 126B, collectively referred to as the virtual machine computer programs 126, running thereon as supported by the virtual host computer program 122. Similarly, the server 104B has virtual machine computer programs 128A and 128B, collectively referred to as the virtual machine computer programs 128, running thereon as supported by the virtual host computer program 124. Although there are two of the virtual machine computer programs 128 and 126 for each of the servers 104 in FIG. 1, in other embodiments of the invention there can be more or less virtual machine computer programs.

The virtual machine computer programs 126 and 128 are separate partitions that enable the servers 104 to run independent and multiple instances of operating systems thereon, such as versions of the Microsoft Windows® operating system, versions of the UNIX® operating system, and versions of the Linux® operating system. As such, each of the virtual machine computer programs 126 and 128 can be considered a virtual computer, in that the operating systems running on the virtual machine computer programs 126 and 128 operate as if they were the only operating systems running on their respective servers 104. Therefore, a virtual machine computer program is a single system image within a computer that supports multiple system images. Each system image contains the operating system and its associated applications, and each image may have the same operating system or a different operating system. The operating systems running on the virtual machine computer programs 126 and 128 allow application computer programs to be executed thereon.

The coordinator server 110 is a server computing device, and may include hardware such as processors, memory, storage, and network adapters, as well as other types of hardware, which are not particularly depicted in FIG. 1. The coordinator server 110 coordinates the virtual machine computer programs 126 and 128 supported by the virtual host computer programs 122 and 124 running on the servers 104. In particular, the coordinator server 110 monitors in conjunction with which of the virtual host computer programs 122 and 124, and thus, indirectly, which of the servers 104, each of the virtual machine computer programs 126 and 128 is running.

The coordinator server 110 further is able to accomplish migration of virtual machine computer programs from one of the servers 104 to another of the servers 104. That is, the coordinator server 110 specifically initiates, facilitates, and orchestrates such migration. For instance, the coordinator server 110 is able to cause either or both of the virtual machine computer programs 128 to migrate, or move, from being supported by the virtual host computer program 124 of the server 104B to being supported by the virtual host computer program 122 of the server 104A. In at least some embodiments of the invention, the migration of virtual host computer programs among the servers 104 is dynamic, which means that the virtual host computer programs do not have to be shut down or restarted before and after moving to a new server.

As a result, the operating systems running on the virtual machine computer programs and the application computer programs running on the operating systems do not have to be shutdown or restarted during the migration process. For example, instances of VMware® virtual machine computer programs, available from VMware, Inc., may be dynamically migrated among virtual host computer programs of servers. In another embodiment, the migration of virtual host computer programs among the servers 104 is static, in that virtual machine computer programs may first have to be shut down before being moved to another server, and then restarted at the new server.

The management server 108 is a server computing device, and may include hardware such as processors, memory, storage, and network adapters, as well as other types of hardware, which are not particularly depicted in FIG. 1. The management server 108 is able to cause the virtual machine computer programs 126 and 128 supported by the virtual host computer programs 122 and 124 running on the servers 104 to migrate between the virtual host computer programs 122 and 124 and thus between the servers 104. For instance, in one embodiment, the management server 108 may migrate the virtual machine computer programs 126 and 128 between the virtual host computer programs 122 and 124 and thus between the servers 104 by sending commands to the coordinator server 110, which actually performs the migration process. In an alternative embodiment, the management server 108 may itself migrate virtual machine computer programs 126 and 128 between the virtual host computer programs 122 and 124 and thus between the servers 104, especially where such migration is static migration, without involving the coordinator server 110, which may not be present in the system 100 in this embodiment.

The management server 108 may control the servers 104 and 108, such as restarting and shutting them down, via the network adapters 112 and 118, which may be remote supervisor adapters in one embodiment. The management server 108 is further to monitor the occurrence or satisfaction of one or more conditions that occur relative to any of the servers 104. In response to any of the conditions being satisfied with respect to a particular one of the servers 104, the management server 108 causes the virtual machine computer programs on this server to migrate to the other server, and then shuts down or causes the server to shut down.

In one embodiment, the management server 108 performs its monitoring functionality in relation to a management agent computer program 130 running on the virtual host 122 of the server 104A, and a management agent computer program 132 running on the virtual host 124 of the server 104B. In another embodiment, the management server 108 may be able to accomplish static migration of the virtual machine computer programs 126 and 128 between the virtual host computer programs 122 and 124 between the servers 104, without involving the coordinator server 110, via the management agent computer programs 130 and 132. As such, the management agent computer programs 130 and 132 may allow the management server 108 to control their servers 104 therethrough. An agent may generally be considered a computer program that runs at the behest of another computer or computer program.

The management agent computer programs 130 and 132 or the network adapters 112 or 118, thus report back to the server 108 when one of the conditions has occurred. For example, one of the conditions may be that one of the servers 104 has been detected or predicted as being failure prone. That is, the management agent computer program running on a server may predict that a failure is likely to occur on the server in the near future. As an illustrative example, the operating temperature of the server may be outside of a desired range, indicating that the cooling subsystem of the server is malfunctioning, and which may portend failure of the entire server itself. Migration of the virtual machine computer programs away from such a failure-prone server therefore provides for maximum server availability. In this example, the management server 108 monitors predictive failure of the servers 104.

Another condition may be that one of the servers 104 is determined as having resource utilization less than a threshold. For instance, the processors of a server may on average have less than 20% utilization, the memory of the server may on average have less than 30% utilization, and so on. Migration of the virtual machine computer programs away from such an under-utilized server may be accomplished so that the server may be shut down to decrease power consumption within the system 100. The virtual machine computer programs utilizing such a low amount of their server's resources are likely to be able to easily be absorbed by another server.

A third example of one of the conditions may be that one of the servers 104 is determined as having power consumption less than a threshold. For instance, a server may be consuming less than 30 watts of power, when during more regular operation the server is likely to consume more than 100 watts of power. Such low power consumption indirectly indicates that the server is being under utilized, such that migration of the virtual machine computer programs away from the server may be accomplished so that the server can be shut down to decrease power consumption. As before, the virtual machine computer programs utilizing such a low amount of their server's resources are likely to be able to easily be absorbed by another server.

The management console 106 is a computing device, such as a client computing device. The console 106 may include hardware such as processors, memory, storage, and network adapters, as well as other types of hardware, which are not particularly depicted in FIG. 1. The management console 106 allows a network administrator or another user to modify parameters associated with the monitoring of the servers 104 and the migration of the virtual machine computer programs 126 and 128 among the servers 104. For instance, the management console 106 may be the mechanism by which a user is able to interact with the management server 108 and change the various thresholds associated with the conditions monitored by the management server 108. A user may be able to change how predictive faults are determined by the management server 108, the thresholds at which resource utilization of the servers 104 is considered low, and/or the thresholds at which power consumption of the servers 104 is considered low, in one embodiment of the invention.

Figure 2:
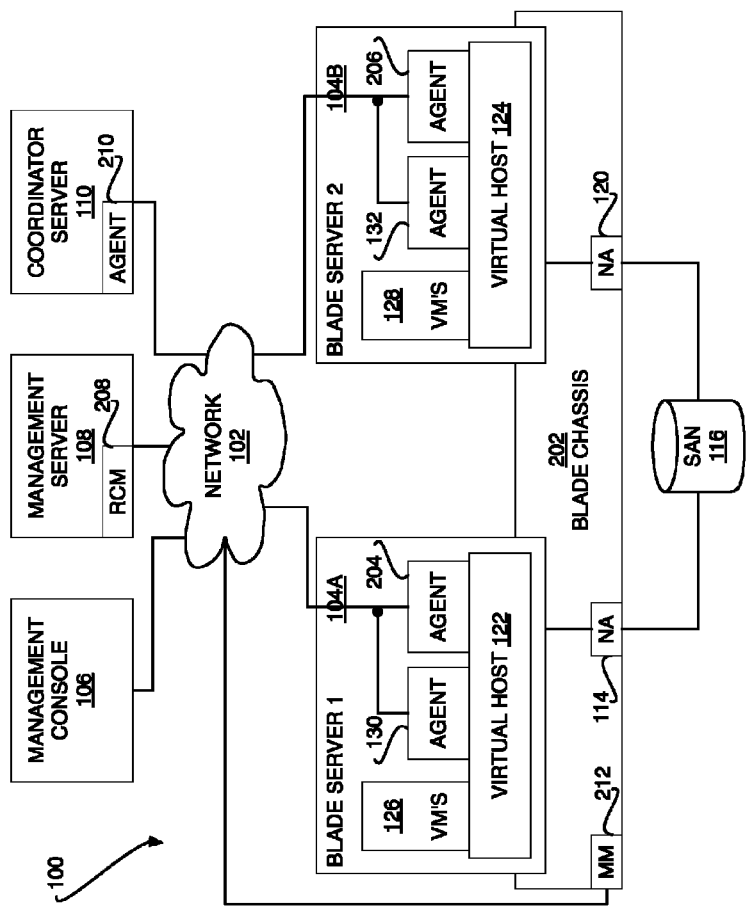
FIG. 2 is a diagram of a system in which there are servers having virtual host computer programs that support virtual machine computer programs, according to another embodiment of the invention.

FIG. 2 shows the system 100, according to another embodiment of the invention. Like-numbered features and components of the system 100 between FIGS. 1 and 2 indicate comparable functionality between the embodiments of FIGS. 1 and 2, and description thereof is not represented in relation to FIG. 2 to avoid redundancy. In the embodiment of FIG. 2, the servers 104 are implemented as blade servers physically connected to a common blade chassis 202. The blade chassis 202 has a backplane into which the blade servers 104 are connected, where the blade servers 104 obtain power and interconnect with other system components via their insertion into the blade chassis 202.

The blade servers 104 are therefore insertable into and controllable by or via the blade chassis 202. The blade servers 104 are thus single-board computers or input/output (I/O) boards. The blade chassis 202 has network adapters 114 and 120 for the blade servers 104A and 104B, through which the blade servers 104 are communicatively connected to the SAN 116. The network adapters 114 and 120 in this embodiment may thus be host bus or board adapters. The blade chassis 202 further has a management module 212, via which the blade chassis 202, and thus the blade servers 104, communicate with the network 102 and thus with the management server 108 and the coordinator server 110. The management module 212 is a hardware module that enables the management server 108 in particular to control the servers 104 of the chassis 202.

The coordinator server 110 is specifically depicted in FIG. 2 as including a management agent computer program 210, through which the management server 108 communicates with the coordinator server 110. The management agent computer program 210 may also be included in the embodiment of FIG. 1, although it is not specifically depicted in FIG. 1. The management server 108 itself is depicted in FIG. 2 as including a resource consumption monitor service 208. The resource consumption monitor service 208 specifically is the mechanism in the embodiment of FIG. 2 by which the management server 108 monitors resource utilization and/or power consumption of the blade servers 104. As such, the blade servers 104 include additional agent computer programs 204 and 206 that are resource consumption monitor agent computer programs monitoring resource utilization and/or power consumption of the blade servers 104. The resource consumption monitor agent computer programs 204 and 206 monitor the resource utilization and/or power consumption of their respective blade servers 104, communicating back to the resource consumption monitor service 208, and thus to the management server 108, when resource utilization and/or power utilization drops below a given threshold.

Ensuring Maximum Server Availability

FIG. 3 shows a method 300 for ensuring maximum server availability, according to an embodiment of the invention. The method 300 may be performed in relation to the system 100 of FIG. 1 or FIG. 2. The method 300 is specifically described in relation to the system 100 of FIG. 1 for examples purposes only. Furthermore, the method 300 may be implemented as a computer program that can be stored on and/or executed from a computer-readable medium. Such a medium may include a volatile or non-volatile medium, a semiconductor medium, a magnetic medium, and/or an optical medium.

The management server 108 first receives user specification of failure conditions as entered by a user at the management console 106 (302). For instance, the user may specify the types of failures of the servers 104 to be predicted or detected by the management server 108, by the agent computer programs 130 and 132, or by the network adapters 112 and 118. The user may further specify the courses of action to be taken by the management server 108 when such imminent failure of any of the servers 104 is detected. Most generally, the user specifies one or more conditions corresponding to predictive failure of any of the servers 104.

Thereafter, one of the agent computer programs 130 and 132 or one of the network adapters 112 and 118 detects a potential coming failure at the server 104A or 104B (304). That is, one of the agent computer programs 130 and 132 predicts that either the server 104A or 104B may fail. For descriptive simplicity, the server 104B is presumed to be the failing server, such that the agent computer program 132 or the network adapter 118 detects that the server 104B may imminently fail. The agent computer program 132 or the network adapter 118 reports back to the management server 108, indicating that the server 104B may fail.

The management server 108 communicates with the coordinator server 110 and the agent 132 to determine which of the virtual machine computer programs 126 and 128 is running on the virtual host 124 (306). That is, the management server 108 receives alerts from the agent 132 or the network adapter 118 and correlates the server 104B with virtual host 124 through previous interface with the agent. The management server then passes to the coordinator server 110 the identity of virtual host 124. In response, the coordinator server 110 correlates the virtual machine computer programs 128A and 128B supported by the virtual host computer program 124. The coordinator server 110 reports this information to the management server 108.

The virtual machine computer programs 128 are dynamically migrated from the virtual host computer program 124 running on the potentially failing server 104B to the virtual host computer program 122 running on the server 104A (308). In one embodiment, the management server 108 may communicate with the coordinator server 110 to cause the coordinator server 110 to accomplish such dynamic migration. Once the migration of the virtual machine computer programs 128 to the server 104A is complete, the coordinator server 110 may report back to the management server 108 that the migration has been successfully completed.

The virtual host computer program 124 is then shut down (310). In one embodiment, the management server 108 may communicate with the coordinator server 110 to stop execution of the virtual host computer program 124. The potentially failing server 104B is finally shut down (312). In one embodiment, the management server 108 may remotely shut down the server 104B via its agent computer program 132. In another embodiment, the management server 108 may instruct the user at the management console 106 to manually shut down the server 104B.

Ensuring Power Conservation by Monitoring Server Resource Utilization

FIG. 4 shows a method 400 for achieving power conservation by monitoring server resource utilization, according to an embodiment of the invention. The method 400 may be performed in relation to the system 100 of FIG. 1 or FIG. 2. The method 400 is specifically described in relation to the system 100 of FIG. 2 for examples purposes only. Furthermore, like the method 300 of FIG. 3, the method 400 of FIG. 4 may be implemented as a computer program that can be stored on and/or executed from a computer-readable medium. Such a medium may include a volatile or non-volatile medium, a semiconductor medium, a magnetic medium, and/or an optical medium.

The management server 108 first receives user specification of resource utilization conditions as entered by a user at the management console 106 (402). For instance, the user may specify the resource utilization threshold at which the servers 104 are considered to be utilizing a low amount of their resources, as detected by the management server 108 and/or by the agent computer programs 204 and 206. The user may further specify the courses of action to be taken by the management server 108 when such low resource utilization of any of the servers 104 is detected. Most generally, the user specifies one or more conditions corresponding to resource utilization of any of the servers 104.

Thereafter, one of the agent computer programs 204 or 206 detects resource utilization of the server 104A or 104B as being less than a threshold (404). That is, one of the agent computer programs 204 and 206 detects that either the server 104A or 104B has less than a threshold percentage of its resources being utilized. For descriptive simplicity, the server 104B is presumed to be the server having its resources utilized less than the threshold percentage, such that the agent computer program 206 detects this condition. The agent computer program 206 reports such detection back to the resource consumption monitor service 208 of the management server 108.

The management server 108 communicates with the coordinator server 110 and the agent 132 to determine which of the virtual machine computer programs 126 and 128 is running on the virtual host 124 (406). That is, the management server 108 passes to the coordinator server 110 the identity of virtual host 124. In response, the coordinator server 110 correlates the virtual machine computer programs 128A and 128B with the virtual host computer program 124. The coordinator server 110 reports this information to the management server 108.

The virtual machine computer programs 128 are dynamically migrated from the virtual host computer program 124 running on the server 104B to the virtual host computer program 122 running on the server 104A (408). In one embodiment, the management server 108 may communicate with the coordinator server 110 to cause the coordinator server 110 to accomplish such dynamic migration. Once the migration of the virtual machine computer programs 128 to the server 104A is complete, the coordinator server 110 may report back to the management server 108 that the migration has been successfully completed. Communication between the coordinator server 110 and the management server 108 may be accomplished via the agent computer program 210 of the coordinator server 110.

The virtual host computer program 124 is then shut down (410). In one embodiment, the management server 108 may communicate with the coordinator server 110 to stop execution of the virtual host computer program 124. The server 104B is finally shut down (412). In one embodiment, the management server 108 may remotely shut down the server 104B via its agent computer program 132 or the management module 212. In another embodiment, the management server 108 may instruct the user at the management console 106 to manually shut down the server 104B.

Ensuring Power Conservation by Monitoring Server Power Consumption

FIG. 5 shows a method 500 for achieving power conservation by monitoring server power consumption, according to an embodiment of the invention. The method 500 may be performed in relation to the system 100 of FIG. 1 or FIG. 2. The method 500 is specifically described in relation to the system 100 of FIG. 2 for examples purposes only. Furthermore, like the method 300 of FIG. 3 and the method 400 of FIG. 4, the method 500 of FIG. 5 may be implemented as a computer program that can be stored on and/or executed from a computer-readable medium. Such a medium may include a volatile or non-volatile medium, a semiconductor medium, a magnetic medium, and/or an optical medium.

The management server 108 first receives user specification of power consumption conditions as entered by a user at the management console 106 (502). For instance, the user may specify the power consumption threshold at which the servers 104 are considered to be utilizing a low amount of power, as detected by the management server 108, by the agent computer programs 204 and 206, or by the management module 212. The user may further specify the courses of action to be taken by the management server 108 when such low power consumption of any of the servers 104 is detected. Most generally, the user specifies one or more conditions corresponding to power consumption of any of the servers 104.

Thereafter, one of the agent computer programs 204 or 206 or the management module 212 detects power consumption of the server 104A or 104B as being less than a threshold (504). That is, one of the agent computer programs 204 and 206 detects that either the server 104A or 104B has less than a threshold amount of power being consumed. For descriptive simplicity, the server 104B is presumed to be the server consuming less than the threshold amount of power, such that the agent computer program 206 detects this condition. The agent computer program 206 reports such detection back to the resource consumption monitor service 208 of the management server 108.

The management server 108 communicates with the coordinator server 110 and the agent 132 to determine which of the virtual machine computer programs 126 and 128 is running on the virtual host 124 (506). That is, the management server 108 passes to the coordinator server 110 the identity of virtual host 124. In response, the coordinator server 110 correlates the virtual machine computer programs 128A and 128B with the virtual host computer program 124. The coordinator server 110 reports this information to the management server 108.

The virtual machine computer programs 128 are dynamically migrated from the virtual host computer program 124 running on the server 104B to the virtual host computer program 122 running on the server 104A (508). In one embodiment, the management server 108 may communicate with the coordinator server 110 to cause the coordinator server 110 to accomplish such dynamic migration. Once the migration of the virtual machine computer programs 128 to the server 104A is complete, the coordinator server 110 may report back to the management server 108 that the migration has been successfully completed. Communication between the coordinator server 110 and the management server 108 may be accomplished via the agent computer program 210 of the coordinator server 110.

The virtual host computer program 124 is then shut down (510). In one embodiment, the management server 108 may communicate with the coordinator server 110 to stop execution of the virtual host computer program 124. The server 104B is finally shut down (512). In one embodiment, the management server 108 may remotely shut down the server 104B via its agent computer program 132 or the management module 212. In another embodiment, the management server 108 may instruct the user at the management console 106 to manually shut down the server 104B.

Conclusion

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

We claim:

1. An article of manufacture comprising:
    a non-transitory computer-readable medium;
    means in the medium for:
        predicting a failure at a first server computing device, where prediction of the failure is performed by one of: a network adapter of the first server computing device, or an agent computer program running on a virtual host computer program running on the first server computing device;
        in response to predicting the failure at the first server computing device, communicating the prediction of the failure at the first server computing device to the management server by the one of the network adapter of the first server computing device or the agent computer program running on the virtual host computer program running on the first server computing device, where communication of the prediction of the failure occurs from the one of the network adapter or the agent computer program to the management server without passing through a coordinator server different than the management server;
        in response to receiving the communication of the prediction of the failure, correlating the first server computing device with the virtual host computer program running on the first server computing device, by the management server, and sending an identity of the virtual host computer program from the management server to the coordinator server;
        in response to receiving the identity of the virtual host computer program from the management server, correlating the virtual host computer program with one or more virtual machine computer programs supported by the virtual host computer program, by the coordinator server, and sending information regarding the virtual machine computer programs from the coordinator server to the management server;
        after receiving the information regarding the virtual machine computer programs from the coordinator server, sending an instruction from the management server to the coordinator server to dynamically migrate the virtual machine computer programs from the virtual host computer program of the first server computing device; and,
        in response to receiving the instruction from the management server, dynamically migrating the virtual machine computer programs from the virtual host computer program of the first server computing device to a virtual host computer program of a second server computing device, by the coordinator server.

2. The article of manufacture of claim 1, wherein the means is further for specifying one or more conditions corresponding to the failure predicted at the first server computing device.

3. The article of manufacture of claim 1, wherein the means is further for:
    stopping execution of the virtual host computer program of the first server computing device; and,
    turning off the first server computing device.

4. The article of manufacture of claim 1, wherein dynamically migrating the virtual machine computer programs comprises sending a command from a management server computing device to a coordinator server computing device able to control the virtual host computer programs of the first and the second server computing devices.

5. An article of manufacture comprising:
    a non-transitory computer-readable medium;
    means in the medium for:
        detecting resource utilization at a first server computing device less than a threshold, where detection of the resource utilization as less than the threshold is performed by one of: a network adapter of the first server computing device, or an agent computer program running on a virtual host computer program running on the first server computing device;
        in response to the detection, communicating the detection of the resource utilization as less than the threshold to the management server by the one of the network adapter of the first server computing device or the agent computer program running on the virtual host computer program running on the first server computing device, where communication of the detection occurs from the one of the network adapter or the agent computer program to the management server without passing through a coordinator server different than the management server;
        in response to receiving the communication of the detection, correlating the first server computing device with the virtual host computer program running on the first server computing device, by the management server, and sending an identity of the virtual host computer program from the management server to the coordinator server;
        in response to receiving the identity of the virtual host computer program from the management server, correlating the virtual host computer program with one or more virtual machine computer programs supported by the virtual host computer program, by the coordinator server, and sending information regarding the virtual machine computer programs from the coordinator server to the management server;
        after receiving the information regarding the virtual machine computer programs from the coordinator server, sending an instruction from the management server to the coordinator server to dynamically migrate the virtual machine computer programs from the virtual host computer program of the first server computing device; and,
        in response to receiving the instruction from the management server, dynamically migrating the virtual machine computer programs from the virtual host computer program of the first server computing device to a virtual host computer program of a second server computing device, by the coordinator server.

6. The article of manufacture of claim 5, wherein the means is further for specifying one or more conditions corresponding to the resource utilization at the first server computing device less than the threshold.

7. The article of manufacture of claim 5, wherein the means is further for:
- stopping execution of the virtual host computer program of the first server computing device; and,
- turning off the first server computing device.

8. The article of manufacture of claim 5, wherein dynamically migrating the virtual machine computer programs comprises sending a command from a management server computing device to a coordinator server computing device able to control the virtual host computer programs of the first and the second server computing devices.

9. An article of manufacture comprising:
- a non-transitory computer-readable medium;
- means in the medium for:
  - detecting power consumption of a first server computing device less than a threshold, where detection of the power consumption as less than the threshold is performed by one of: a network adapter of the first server computing device, or an agent computer program running on a virtual host computer program running on the first server computing device;
  - in response to the detection, communicating the detection of the power consumption as less than the threshold to the management server by the one of the network adapter of the first server computing device or the agent computer program running on the virtual host computer program running on the first server computing device, where communication of the prediction of the failure occurs from the one of the network adapter or the agent computer program to the management server without passing through a coordinator server different than the management server;
  - in response to receiving the communication of the detection, correlating the first server computing device with the virtual host computer program running on the first server computing device, by the management server, and sending an identity of the virtual host computer program from the management server to the coordinator server;
  - in response to receiving the identity of the virtual host computer program from the management server, correlating the virtual host computer program with one or more virtual machine computer programs supported by the virtual host computer program, by the coordinator server, and sending information regarding the virtual machine computer programs from the coordinator server to the management server;
  - after receiving the information regarding the virtual machine computer programs from the coordinator server, sending an instruction from the management server to the coordinator server to dynamically migrate the virtual machine computer programs from the virtual host computer program of the first server computing device; and,
  - in response to receiving the instruction from the management server, dynamically migrating the virtual machine computer programs from the virtual host computer program of the first server computing device to a virtual host computer program of a second server computing device, by the coordinator server.

10. The article of manufacture of claim 9, wherein the means is further for specifying one or more conditions corresponding to the power consumption at the first server computing device less than the threshold.

11. The article of manufacture of claim 9, wherein the means is further for:
- stopping execution of the virtual host computer program of the first server computing device; and,
- turning off the first server computing device.

12. The article of manufacture of claim 9, wherein dynamically migrating the virtual machine computer programs comprises sending a command from a management server computing device to a coordinator server computing device able to control the virtual host computer programs of the first and the second server computing devices.

* * * * *